United States Patent [19]
Kalonji et al.

[11] Patent Number: 5,457,759
[45] Date of Patent: Oct. 10, 1995

[54] MONOLITHIC OPTICAL SYSTEM AND METHOD OF MAKING SAME INCLUDING IMPROVED COUPLING MEANS BETWEEN AN OPTICAL FIBER AND A PHOTOTRANSDUCER

[75] Inventors: Ndiata Kalonji, Ivry S/Seine; Jack Semo, Palaiseau, both of France

[73] Assignee: France Telecom, Paris, France

[21] Appl. No.: 166,923

[22] Filed: Dec. 14, 1993

[30] Foreign Application Priority Data

Dec. 15, 1992 [FR] France ............... 92 15091

[51] Int. Cl.⁶ .................... G02B 6/32; C03C 25/02
[52] U.S. Cl. .................... 385/31; 385/33; 385/34; 385/27; 385/28; 385/88; 385/124; 385/98; 65/385; 65/387; 65/406; 65/407
[58] Field of Search ............... 385/31, 33, 34, 385/27, 28, 88, 93, 95, 96, 98, 124, 14; 65/1, 2, 3.11, 4.1, 4.2, 385, 387, 392, 404, 406, 407, 411

[56] References Cited

U.S. PATENT DOCUMENTS

| | | | |
|---|---|---|---|
| 4,199,222 | 4/1980 | Ikushima et al. | 385/93 X |
| 4,290,667 | 9/1981 | Chown | 385/34 X |
| 4,701,011 | 10/1987 | Emkey et al. | 385/33 X |
| 4,867,776 | 9/1989 | Sharp | 65/2 |
| 5,127,074 | 6/1992 | Watanabe et al. | 385/93 |
| 5,315,609 | 5/1994 | Tanaka et al. | 372/43 |
| 5,353,294 | 10/1994 | Shigeno | 372/43 |
| 5,384,874 | 1/1995 | Hirai et al. | 385/34 |

FOREIGN PATENT DOCUMENTS

| | | | |
|---|---|---|---|
| 0155379 | 11/1984 | European Pat. Off. | 385/33 X |
| 0184432 | 6/1986 | European Pat. Off. | 385/34 X |
| 2548391 | 6/1987 | European Pat. Off. | 65/2 X |
| 57-97510 | 6/1982 | Japan | 385/34 X |
| 62-296105 | 12/1987 | Japan | 385/34 X |
| 55-35369 | 3/1990 | Japan | 385/34 X |
| WO86/04156 | 7/1986 | WIPO | 385/33 X |

OTHER PUBLICATIONS

Patent Abstracts of Japan, vol. 13, No. 572 (P-978) Dec. 18, 1989 & JP-A-12 39 508 (Fujitsu) Sep. 25, 1989.
Patent Abstracts of Japan, vol. 9, No. 262 (P-398) Oct. 19, 1985 & JP-A-60 111 208 (Matsushita Denki Sangyo) Jun. 17, 1985.
Patent Abstracts of Japan, vol. 15, No. 499 (P-1275) Nov. 14, 1991 & JP-A-31 89 607 (NTT) Aug. 19, 1985.
Patent Abstracts of Japan, vol. 7, No. 282 (P-243) Dec. 16, 1983 & JP-A-58 158 620 (Hitachi Seisakusho) Sep. 20, 1983.

*Primary Examiner*—Brian Healy
*Attorney, Agent, or Firm*—Blakely, Sokoloff, Taylor & Zafman

[57] ABSTRACT

An optical system comprising a monomode main optical fiber coupled to a phototransducer, by means of an assembly between the monomode optical fiber and the phototransducer, which assembly comprises, in succession: a piece of graded index multimode fiber, a piece of step index multimode fiber, and a microlens.

34 Claims, 5 Drawing Sheets

MONOLITHIC OPTICAL SYSTEM AND METHOD OF MAKING SAME INCLUDING IMPROVED COUPLING MEANS BETWEEN AN OPTICAL FIBER AND A PHOTOTRANSDUCER

FIELD OF THE INVENTION

The present invention relates to the field of optical fibers that are to be coupled with phototransducers.

In the context of the present invention, the term "phototransducer" covers optical receiver systems suitable for transforming a received optical signal coming from an optical fiber into an electrical signal, and optical transmitter systems suitable for generating an optical signal for application to an optical fiber. Such an optical system may be constituted by an optical integrated circuit.

More precisely, the present invention relates to an optical system including improved coupling means between an optical fiber and a phototransducer, both in the phototransducer-to-fiber transmission direction and in the opposite, or reception direction.

The present invention relates most particularly to telecommunications. It also relates in particular to monomode type fibers of small core size.

Nevertheless, the present invention is not limited to that particular field of use, nor to that specific type of fiber.

BACKGROUND OF THE INVENTION

Various solutions and multiple optical combinations have been devised in the past for achieving coupling between a phototransducer and an optical fiber.

The document "Progress in monomode optical fiber interconnection devices", published in "Journal of Lightwave Technology", Vol. LT-2, No. 3, pp. 217–227, June 1984, analyzes various such solutions.

Overall, such known solutions can be classified into four categories.

As shown in FIG. 1, systems in the first category include a single discrete optical element 20 such as a lens that may be aspherical, spherical, or otherwise, that is interposed between a fiber 10 and a phototransducer 30. Such systems serve both to increase the numerical aperture and to increase the working distance dw between the phototransducer 30 and the coupled element 20. Nevertheless, such known systems are bulky because they use a discrete element 20 of large size. In addition, such systems are difficult to implement because they require two mounts and two separate X, Y, Z adjustments.

As shown in FIG. 2, systems of the second category have two discrete lenses 20 and 22 interposed between the fiber 10 and the phototransducer 30. This theoretically satisfactory solution makes it possible likewise to increase both numerical aperture and working distance dw. Nevertheless, when implemented, it is not entirely satisfactory. This configuration gives rise to a system that is very bulky: by using large-sized discrete optical elements 20 and 22 the length Lopt between the inlet face of the first lens and the fiber can easily reach 5 mm with a diameter that is equivalent. In addition, it is also difficult to implement this system. Three mounts and three separate X, Y, Z adjustments are required: one for the fiber 10 and two others for the lenses 20 and 22.

As shown in FIG. 3, systems in the third category comprise a microlens 20 placed on the end of the fiber 10 over its core 12. These systems are those that are in most widespread use. They generally require radii of curvature r of the order of 7 µm for the microlenses 20 and working distances dw of the order of 10 µm between the phototransducer 30 (e.g. a laser diode) and the fiber 10 fitted with its microlens. Nevertheless, these systems also suffer from various drawbacks. Microlenses 20 are difficult to make reproducibly (it is difficult to control the radii of curvature). This characteristic which degrades coupling is essentially due to the small radii of curvature required. The feedback on the emitting source 30 (laser diode) is large, thus disturbing its characteristics. This phenomenon is related to the small working distances dw imposed by this system. There are considerable risks for the phototransducer 30 due to the proximity of the microlens 30. In addition, the system can become dangerous for the phototransducer 30 if highly divergent beams are being used since the working distance dw then needs to be reduced even further in order to enable all of the light from the phototransducer to be collected. The accuracy required for alignment remains very high because of the small radii of curvature r and because of the small working distance dw.

As shown in FIG. 4, systems of the fourth category comprise a glass element 20 provided with a lens 22 that is interposed between the fiber 10 and the phototransducer 30. By optimizing the distance d1 between the fiber 10 and the outlet face of the glass element 20, and by optimizing the thickness d2 of the glass element 20, it is possible to double the radius of curvature r of the lens 22 and the working distance dw between the phototransducer 30 and the inlet face of the glass element 20 in comparison with microlens-fitted fiber systems as shown in FIG. 2. Nevertheless, these systems also suffer from certain drawbacks. Firstly, the increase in the radius of curvature r of the lens and in the working distance dw nevertheless remain relatively small. The configuration comprising a lens in association with a glass element thus continues to suffer, although to a lesser extent, to the same drawbacks as the system having a fiber fitted with a microlens, as shown in FIG. 3. In addition, if the distance d1 between the fiber 10 and the glass element 20 is chosen to be non-zero, then the system requires two mounts and two X, Y, Z adjustments, instead of only one.

Proposals have also been made in documents EP-A-0 155 379 and JP-A-31 89 607 for coupling devices based on pieces of graded index fiber. Nevertheless, such systems do not appear to have given rise to industrial applications.

In conclusion, known systems are not entirely satisfactory.

OBJECTS AND SUMMARY OF THE INVENTION

An object of the present invention is to improve known systems in the state of the art by mitigating their main drawbacks.

A particular object of the present invention is to provide a system that avoids any risk of the phototransducer being damaged by contact, and that avoids any risk of its operation being disturbed by beam feedback from the end of the fiber.

An auxiliary object of the present invention is to provide a system that enables the fiber to be moved as far as possible away from the phototransducer.

According to the present invention, these objects are achieved by means of an optical system comprising a monomode main optical fiber coupled to a phototransducer, by means of an assembly between the monomode optical fiber and the phototransducer, which assembly comprises, in succession: a piece of graded index multimode fiber, a piece of step index multimode fiber, and a microlens.

According to an advantageous further characteristic of the present invention, the microlens is constituted by a multiple lens having a radius of curvature that increases with increasing distance from the phototransducer.

According to another advantageous characteristic of the present invention, the various elements interposed between the phototransducer and the monomode fiber are spliced to a cleaved end face of the monomode fiber.

According to another advantageous characteristic of the present invention, the piece of step index multimode fiber is designed to match the diameter of the light beam to the working diameter of the piece of graded index multimode fiber.

BRIEF DESCRIPTION OF THE DRAWINGS

Other characteristics, objects, and advantages of the present invention appear on reading the following detailed description given with reference to the accompanying drawings showing non-limiting examples, and in which.

MORE DETAILED DESCRIPTION

Figure 5:
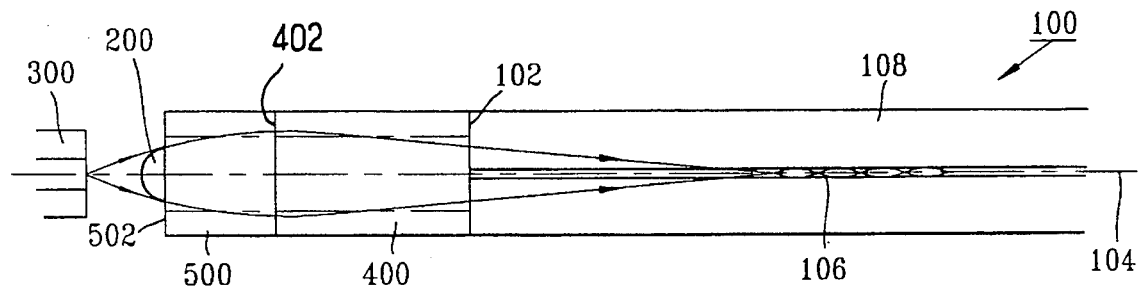
FIG. 5 is a diagrammatic longitudinal axial section view through a system of the present invention comprising a graded index multimode optical fiber, a step index multimode fiber, and a microlens interposed between a monomode optical fiber and a phototransducer.

Accompanying FIG. 5 shows a monomode fiber 100 having a cleaved end surface 102 that is plane and perpendicular to its longitudinal axis 104. In FIG. 5, the core of the monomode optical fiber 100 is referenced 106, while its cladding is referenced 108.

FIG. 5 also shows a transducer 300 placed facing the optical fiber 100, together with a piece 400 of graded index multimode fiber, a piece 500 of step index multimode fiber, and a microlens 200 all interposed between the cleaved end 102 of the monomode optical fiber 100 and the phototransducer 300. The phototransducer 300, the piece of graded index multimode fiber 400, the piece of step index multimode fiber 500, and the microlens 200 are all centered on the longitudinal axis 104 of the monomode fiber 100. Still more precisely, the piece 400 of graded index multimode fiber rests against the cleaved end surface 102 of the monomode fiber 100, and said piece 400 of graded index multimode fiber in turn supports the piece 500 of step index multimode fiber which in turn carries the microlens 200 on its other end.

Figure 6:
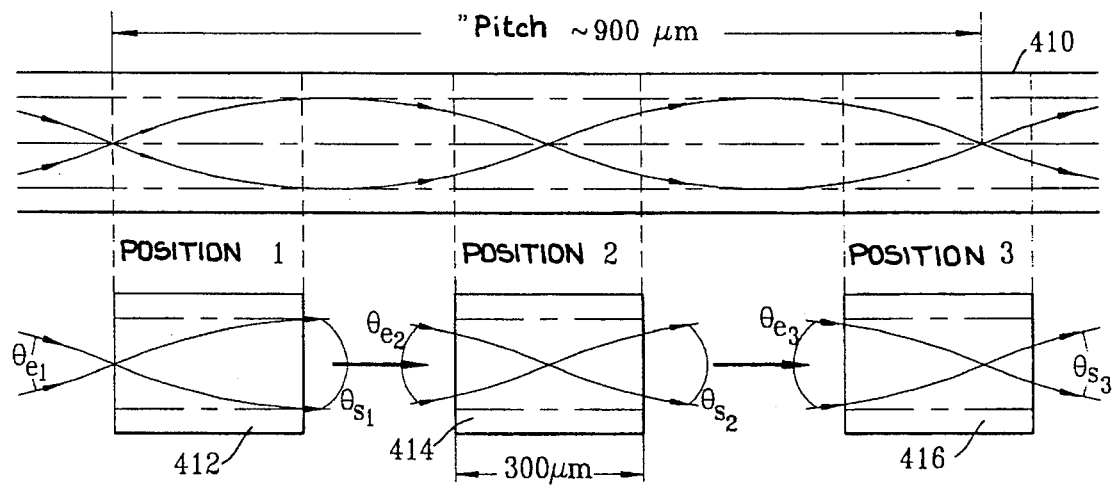
FIG. 6 is a diagram showing the propagation of a lightwave guided in a graded index multimode optical fiber.

Accompanying FIG. 6 shows a graded index multimode fiber 410 diagrammatically subdivided into three portions 412, 414, and 416 all forming parts of said multimode fiber 410.

In FIG. 6, the term "pitch" is used to designate the period of the graded index multimode fiber, which fiber is used as a graded index lens rather than as a fiber. The value of said "pitch" is determined mainly by the profile of the graded index.

More precisely, FIG. 6 shows how a lightwave guided in a graded index multimode fiber 410 propagates.

It will be understood on examining portions 412, 414, and 416 in FIG. 6 that it is the characteristics of core diameter and of graded index profile that determine the period with which the guided lightwave is propagated.

Thus, a calibrated length of graded index multimode fiber 410 is capable of providing pairs of inlet/outlet angles that match exactly. In other words, starting from a given incident conical beam, the length of the graded index multimode optical fiber can be used to obtain a conical outlet beam of any desired cone angle.

Thus, starting with an inlet beam coming from the phototransducer 300 after passing through the microlens 200 and the piece of fiber 500 of known characteristics, applied to the inlet of the element of graded index multimode fiber 400, there is no difficulty in choosing the appropriate length for the element of fiber 400 that will give rise to an outlet beam of determined aperture that is compatible with the characteristics of the monomode fiber 100 with which coupling is to be achieved.

The piece of graded index multimode optical fiber 400 preferably has a length of the order of $[(¼)+(n/2)]$ times the pitch where n = 0, 1, 2, ...

Nevertheless, the aperture of the beam input into the multimode fiber 400 must not exceed its own numerical aperture.

Unfortunately, the emission cones of phototransducers 300, e.g. laser diodes, may be as great as 70°, whereas those associated with the inlet characteristics of monomode fibers and of graded index multimode fibers have respective apex angles of 10° and of 30°. Thus, to obtain optimum coupling between the field emitted by a phototransducer 300 and a monomode fiber 100, it is necessary for the highly divergent beam coming from the source 300 to be converted into a convergent beam that accurately matches the mode of propagation specific to the fiber.

This matching required for good coupling is obtained by means of the microlens 200 placed on the cleaved end face of the element 500.

More precisely, and as explained below, it is preferable to provide a multiple lens of increasing curvature on the cleaved end face of the element 500.

To apply a microlens 200 on the cleaved end face of the step index multimode optical fiber element 500, it is preferable to proceed as follows.

Firstly, the fibers 100, 400, and 500 are cleaved to obtain end faces 102, 402, and 502 that are perpendicular to their axes.

The step of cleaving the optical fibers 100, 400, and 500 consists in sectioning said fibers in such a manner that the resulting end faces 102, 402, and 502 thereof are at least substantially plane and orthogonal to their central axes.

Figure 7:
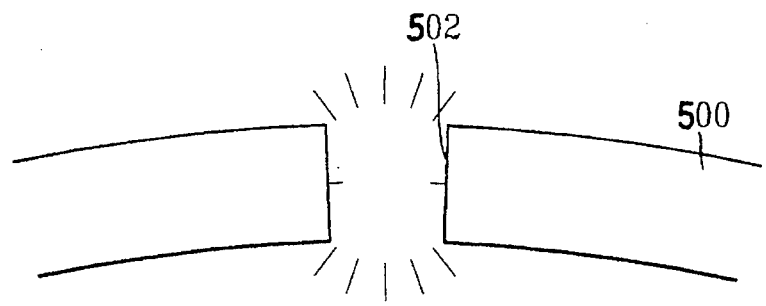
FIGS. 7 to 13 show various steps in a method of fixing a microlens on a cleaved surface of an optical fiber.

This cleaving step can be performed by any sectioning method known to the person skilled in the art, and where applicable, merely by bending the fibers 100, 400, and 500 until they snap at a nick which is provided by means of a very hard cutting edge, as shown diagrammatically in FIG. 7.

To deposit the lens 200 on the cleaved end 502 of the fiber 500, it is preferable to proceed as follows.

Figure 8:
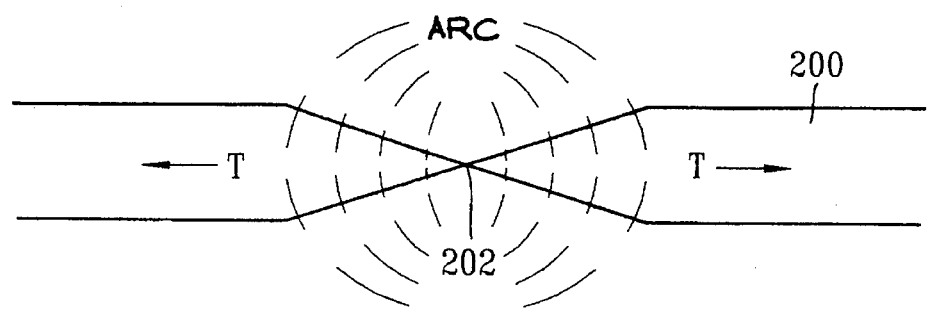

As shown in FIG. 8, a small piece of another fiber 200 is stretched (traction T) axially and symmetrically under the action of an electric arc, and until it breaks at a point 202. The piece of fiber 200 may be about 10 cm long. After the stretching step has been completed, two pieces of optical fiber 200 are obtained, each ending in a conically tapering tip.

Figure 9:
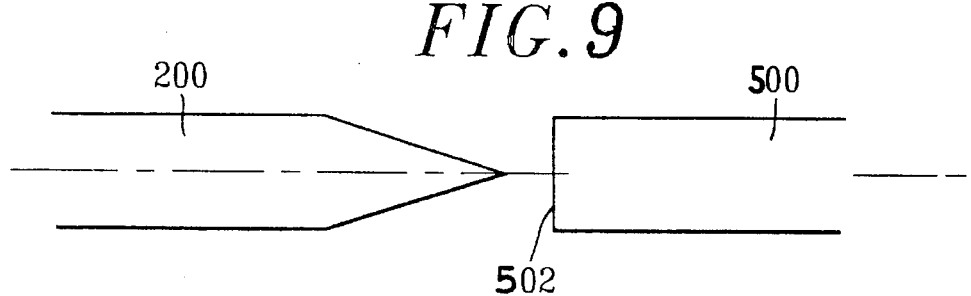

One of the stretched ends of the optical fiber 200 is then placed against the cleaved end 502 of the fiber 500 and in alignment therewith, as shown in FIG. 9. This alignment may be achieved by any appropriate means, e.g. by placing the cleaved fiber 500 and the piece of stretched fiber 200 in appropriate V-supports. Known techniques for splicing optical fibers together commonly make use of such V-supports that are made of sapphire, and that achieve accuracy to within about 1 μm. That is why such V-supports are not shown in the accompanying figures and are not described in greater detail below.

Figure 10:
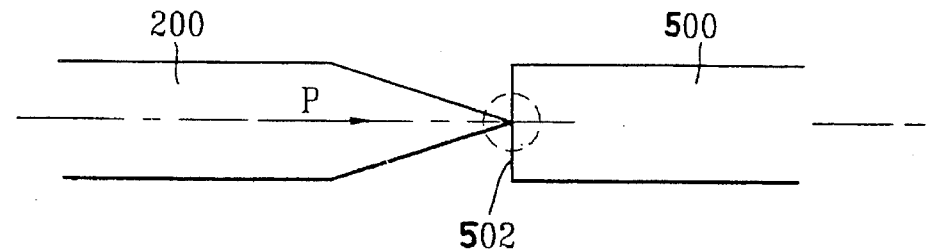

The tip of the stretched fiber 200 is then put into mechanical contact with the cleaved face 502 of the fiber 500, and a small amount of axial pressure P is applied, as shown in FIG. 10, while nevertheless retaining the previous alignment between the stretched fiber 200 and the cleaved fiber 500.

Figure 11:
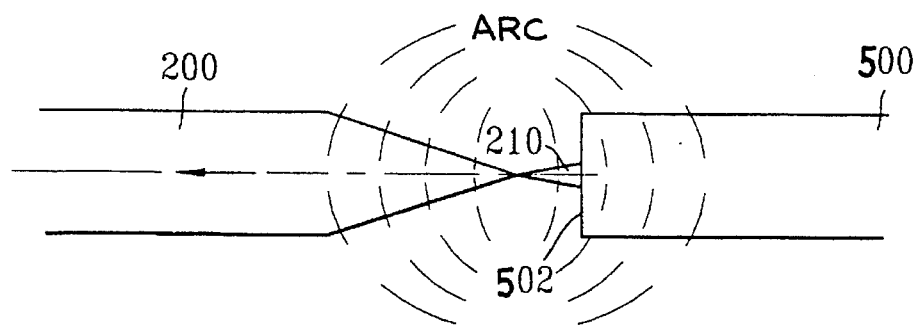
Figure 12:
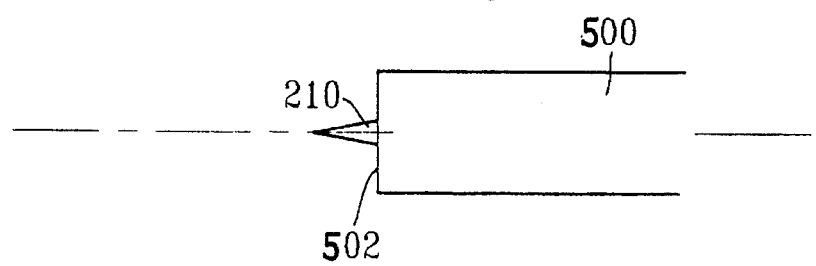

The resulting assembly is subjected to an electric arc, as shown in FIG. 11 to obtain rapid and low intensity melting of the tip of the stretched fiber 200. As soon as a weld appears between said tip and the cleaved fiber 500, the fiber 200 is withdrawn. This has the effect of leaving a small needle of glass 210 centered on and linked with the core of the cleaved fiber 500, as shown in FIG. 12.

Figure 13:
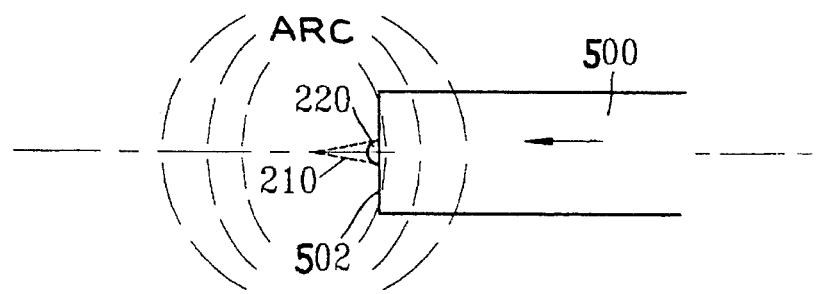

Then, as shown in FIG. 13, it remains merely to melt the needle of glass 210 using one or more passes under a low intensity arc, to transform the needle 210 into a lens 220 having the desired curvature.

The steps described above can be performed in a few minutes. The result is an optical fiber 500 having a cleaved end 502 plus a lens 220 that is welded onto said cleaved end.

The periodic appearance of the propagation of a beam within the piece of multimode optical fiber 400 makes it possible to increase the length of the piece of fiber 400 so as to make the system easier to implement.

At the outlet from the microlens 200, the beam aperture cone, although having a specified angle at the apex, need not coincide with the aperture cone of the graded index multimode fiber 400. To obtain such coincidence, thereby improving coupling between the incident beam and the piece of multimode fiber, a calibrated length of step index fiber 500 is interposed between the lens 200 and the graded index multimode optical fiber 400, as shown in FIG. 5. This piece of step index multimode fiber 500 acts as a same-index intermediary between the microlens 200 and the graded index multimode optical fiber 400. The piece of optical fiber 500 thus serves to increase the diameter of the incident beam up to the working diameter of the graded index multimode optical fiber 400. It also provides an appreciable advantage to the system by increasing the front distance dw between the phototransducer 300 and the microlens 200.

The piece of graded index multimode fiber 400 preferably has a length that is shorter than (n+1) times pitch/2, where n=0, 1, 2, ..., while the piece of step index multimode fiber 500 preferably has a length that is shorter than pitch/4.

By using the above-described components in accordance with the present invention, it is possible to match the divergent beam coming from the source 300 accurately for input into the monomode fiber 100. Coupling is optimized by the accurate matching between the conditions of light propagation (beam aperture) and the modes specific to the various fibers.

Particular data relating to one embodiment of the system of the present invention comprising a microlens 200, a piece of step index multimode fiber 500, and a piece of graded index multimode fiber 400 all interposed between the phototransducer 300 and the monomode optical fiber 100 are given below:

a) for the graded index multimode fiber 400:
   core diameter: 85 μm
   cladding diameter: 125 μm
   numerical aperture: 0.275;

b) for the step index multimode optical fiber 500:
   core index: 1.450
   cladding index: unimportant
   core diameter: 80 μm
   cladding diameter: 125 μm
   numerical aperture arbitrary;

c) for the microlens:
   refractive index n=1.450
   diameter as large as possible given the radius of curvature
   numerical aperture a function of diameter and of focal length.

For a divergence half-angle of about 35° at the inlet to the microlens 200, several possibilities exist, including: a front or working distance dw of the order of 40 μm; a radius of curvature for the microlens of the order of 30 μm; a length of the order of 200 μm for the piece of fiber 400 and of the order of 100 μm for the piece of fiber 500.

The improvements that stem from using the system as described above, and in particular from using a very open and non-converging beam at the outlet from the microlens, unlike conventional systems, are as follows:

1) a reduction in coupling losses, particularly when using highly divergent beams; and 2) the fiber is a considerable distance away, which has the following consequences:

a) a greater focal length for the inlet lens;

b) a reduction in the feedback from the fiber on the phototransducer;

c) an increase in the safety distance or working distance dw to the phototransducer 300;

d) greater ease in aligning the phototransducer with the fiber;

e) better coupling stability; and f) an increase in the size (radii of curvature) of the microlens, thus facilitating alignment and reducing the degree of accuracy that is generally required.

The assembly comprising the monomode fiber 100, the numerical aperture converter constituted by the pieces of fiber 400 and 500, and the microlens 200 is preferably made by splicing, with the fibers 100, 400, and 500 advantageously being chosen to have the same outside diameter, e.g. 125 μm. Such splicing can be performed using a conventional splicing machine, for example such as the model sold under the reference BFS50 by Beale International Technology.

The pieces of fiber 100, 400, and 500 can be cut using a precision fiber-cleaver of the kind available on the market, e.g. the Fujikura CT-07 cleaver.

The monolithic aspect of the system that is obtained after successive splicing operations starting from the monomode fiber 100 and continuing until the lens has been made, makes it possible rapidly to obtain optimum coupling with the phototransducer 300.

According to yet another improvement of the present invention, as mentioned above, provision is made in the context of the present invention to place not a single lens 200 on the cleaved face of the piece of fiber 500, but a multiple lens, i.e. a succession of lenses that are in axial alignment, that are convex, and that are of decreasing radius of curvature on moving away from the fiber 100.

Figure 14:
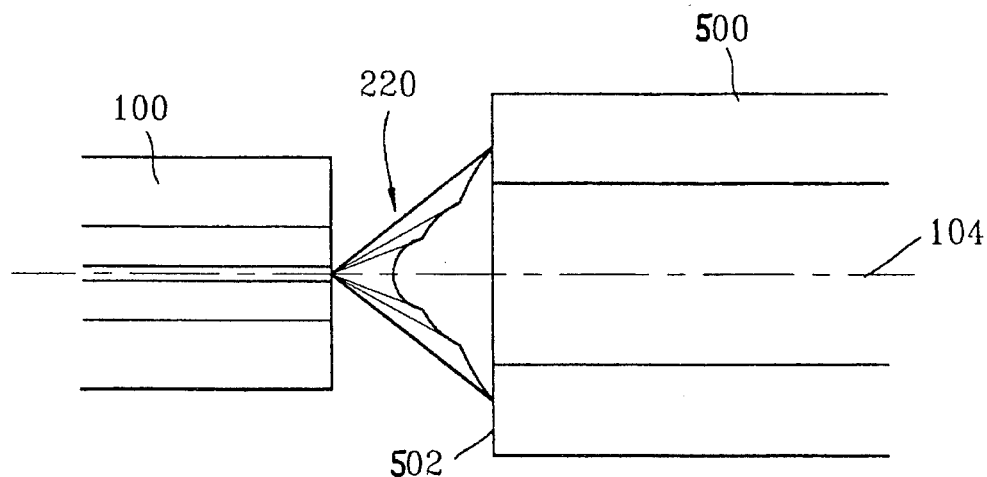
FIG. 14 is a diagram showing a variant embodiment of the present invention comprising a stack of microlenses of decreasing radii of curvature on a cleaved end surface of an optical fiber.

In accompanying FIG. 14, such a set of lenses 200 can be seen deposited on the cleaved face 502 of a piece of step index multimode fiber 500.

To make a plurality of lenses of decreasing diameter, it is necessary to repeat the above-described steps as shown in FIGS. 8 to 13, as many times as there are lenses to be deposited.

In other words, the second lens, and optionally any subsequent lens, is put into place by the following sequence of steps:

a) stretching a new piece of optical fiber;
b) aligning the resulting tip with the axis of the preceding lens, and applying a small amount of contact pressure;
c) surface welding the tip by means of an electric arc;
d) leaving behind a calibrated needle by applying traction to the tip under the arc; and
e) turning the resulting needle into a lens by controlled melting.

It should be observed that during step a), during which a new piece of optical fiber is stretched, the conicity of the tip obtained by stretching must be controlled so that during step d) the needle that is left behind is of appropriate size that is compatible with the radius of curvature desired for the new lens.

In addition, the power of the electric arc used during steps c), d), and e), must be adapted to each of said steps, otherwise the smaller masses of glass will disappear.

To obtain the required melting of the fiber 200, the inventors have performed tests using a microwelder of the type "micro fusion splicer ms-1.008" as sold by Foundation Instruments. Such a microwelder generates an electric arc.

Nevertheless, it is not essential for heating to be obtained by means of an electric arc. Heating may be obtained using a power laser source, providing care is taken to ensure accurate alignment between the cleaved fiber 500 and the stretched end 200 that provides the microlens 220, and providing care is taken to ensure that the tip 200 is subjected to very rapid local melting so as to weld a glass needle 210 of appropriate size onto the cleaved fiber 500.

It is now shown how the use of a succession of convex lenses in axial alignment and of decreasing radius of curvature as described above and as shown in FIG. 14 provides improved coupling between the transducer and the optical fiber, in comparison with the coupling obtained using a simple hemispherical lens.

Figure 1:
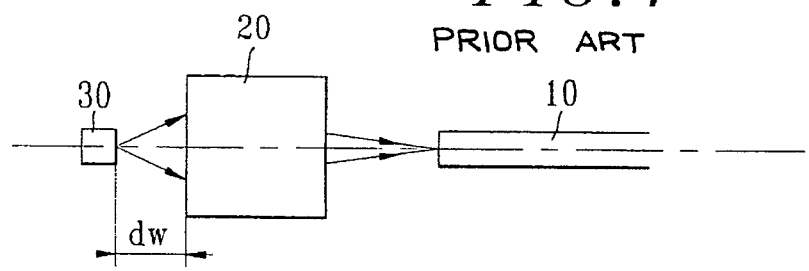
FIGS. 1 to 4 are described above and are diagrams showing four prior art solutions for coupling an optical fiber with a phototransducer.
Figure 2:
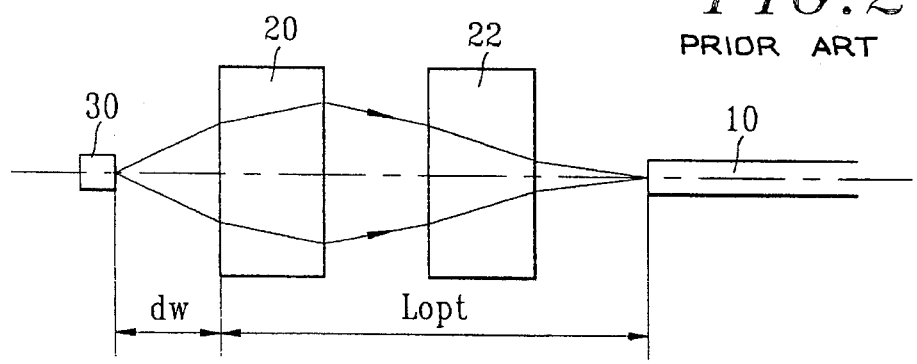
Figure 3:
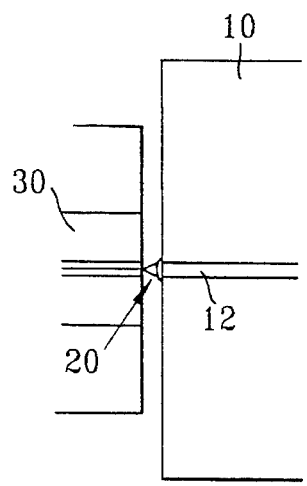
Figure 4:
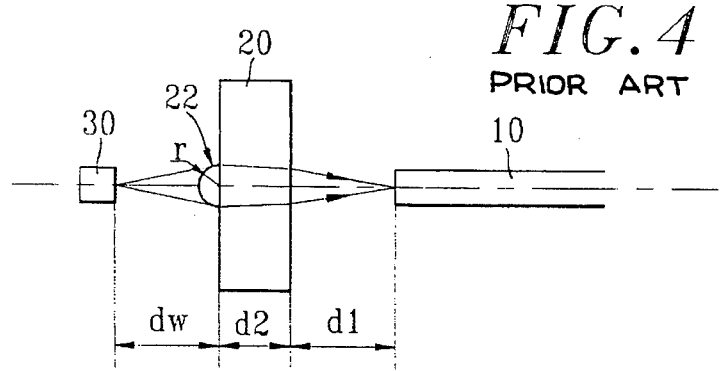

Initially, the inventors have determined that in a conventional system having a simple hemispherical lens, the radius of said lens has a direct effect on the position and on the magnitude of the coupling maximum that is obtained as a function of the distance between the transducer and the fiber along the axis of the fiber and for a given angular aperture of the beam. More precisely, a simple hemispherical lens having a very small radius of curvature (e.g. less than 8 µm) can collect a maximum amount of light only if the distance between the transducer and the lens remains small enough for the emission cone to coincide with the numerical aperture of the lens (as shown diagrammatically in FIG. 3. Naturally this is very constraining, since the fiber must then be positioned at a distance dw from the phototransducer 30 that is equivalent to the radius of curvature, i.e. about 10 µm, and with accuracy in transverse centering of the order of one-tenth of a micrometer.

In the system shown in FIG. 14, the smallest lens 220, i.e. the lens 220 having the smallest radius of curvature and which also constitutes the lens that is furthest away from the cleaved face 502 of the optical fiber, serves to collect the central portion of the emitted beam, i.e. the portion which corresponds to the energy maximum of a Gaussian beam.

The following lens which has a larger radius of curvature co-operates all the way out to its periphery with the portion of the beam that is not blocked off by the preceding lens, and so on assuming that there is a succession of lenses of increasing radius of curvature on approaching the fiber 500.

Figure 15:
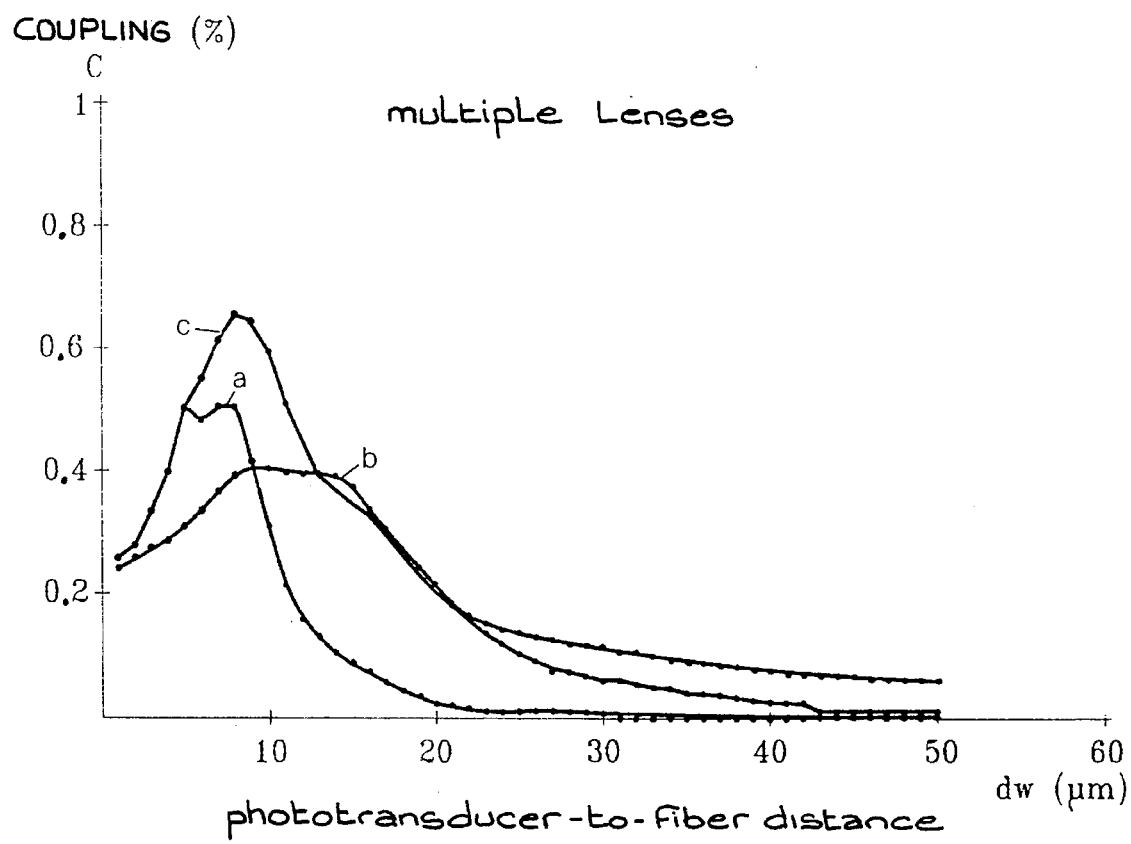
FIG. 15 shows the coupling obtained using various different microlens configurations.

Accompanying FIG. 15 is a graph showing the coupling coefficient obtained between an optical fiber 100 and a phototransducer as a function of the distance dw between them along the axis 104. More precisely, FIG. 15 corresponds to the following data:

8/125 monomode fiber;
radius of the core 106: 4 µm;
beam divergence ±45°;
index of the cladding 108: 1.445;
index of the core 106: 1.450;
wavelength of the radiation: 1.3 µm; and
index of the lenses: 1.450.

Still more precisely, curves 15a and 15b show the values of the coupling coefficient C respectively as obtained using simple hemispherical lenses 220 deposited over the core 106, in one case with a radius of curvature of 4 µm and in the other with a radius of curvature of 8 µm. In addition, the curve identified by the index c in FIG. 15 corresponds to the coupling coefficient obtained using a pair of lenses as shown in FIG. 14, comprising one lens having a radius of curvature of 4 µm and another having a radius of curvature of 8 µm.

By comparing curve 15c with above-mentioned curves 15a and 15b, it can be seen that the coupling coefficient C obtained using a pair of lenses is 35% greater than the best obtained using a simple lens, and an increase in the laser-to-fiber distance dw gives rise to a smaller loss of coupling.

The radii of curvature of lenses 220 that are deposited in succession as shown in FIG. 14 on the cleaved face 502 of the piece of step index multimode optical fiber 500 preferably lie in the range 10 µm to 100 µm.

During the steps in which the various components of the optical system of the present invention are brought into alignment, and in particular while the fibers 100, 400, and 500 are being aligned, and also while the lenses 220 are being aligned on the cleaved face of the corresponding piece of fiber, an optical signal may be injected into the opposite end of the fiber 100. The optical signal is then conveyed by the core of the fiber 100, and passage of the optical signal into the element placed facing said fiber and in the process of being aligned therewith makes it possible to verify that the components are properly positioned.

Such a step of optically monitoring alignment can constitute an effective complement to mechanical alignment.

Naturally, the present invention is not limited to the particular embodiments described above, but it extends to any variant coming within the spirit of the invention.

In a particular, but non-limiting, application of the invention, the inventors have implemented a reversible duplexing laser (emitter/receiver).

We claim:

1. An optical system comprising a monomode main optical fiber coupled to a phototransducer, by means of an assembly between the monomode optical fiber and the phototransducer, which assembly comprises, in succession: a piece of graded index multimode fiber spliced to a cleaved end face of the monomode fiber, said piece of graded index multimode fiber being designed to match an angular opening of a light beam to the mode specific to the monomode optical fiber, a piece of step index multimode fiber spliced to a cleaved end face of the piece of graded index multimode fiber, said piece of step index multimode fiber being designed to match the diameter of the light beam to the working diameter of the piece of graded index multimode fiber, and a microlens fixed to a cleaved end face of said piece of step index multimode fiber, in regard of said phototransducer.

2. A system according to claim 1, wherein the microlens is constituted by a multiple lens having a radius of curvature that increases with increasing distance from the phototransducer.

3. A system according to claim 1, wherein the piece of graded index multimode fiber is designed to match the beam to the mode specific to the monomode optical fiber.

4. A system according to claim 1, wherein the piece of step index multimode fiber is designed to match the diameter of the light beam to the working diameter of the piece of graded index multimode fiber.

5. A method of making a microlens in an optical system comprising a monomode main optical fiber coupled to a phototransducer by means of an assembly comprising in succession a piece of graded index multimode fiber, a piece of step index multimode fiber and a microlens between said monomode fiber and the phototransducer, wherein the microlens is obtained by the following sequence of steps:

a) stretching a piece of optical fiber;

b) aligning the resulting tip on the axis of a cleaved surface of said piece of step index multimode fiber, with contact being obtained under a small amount of pressure;

c) welding the contacting tip to the surface;

d) leaving behind a calibrated needle by applying traction to the tip; and e) forming a microlens by controlled melting of the needle obtained in this way.

6. A method according to claim 5, wherein a multiple lens is obtained by reiterating the above-specified steps.

7. A system according to claim 2, wherein said microlens comprises at least two lenses of different diameters.

8. A system according to claim 1, wherein said microlens comprises a number of lenses which is greater than two.

9. A system according to claim 1, wherein said microlens has a radius which lies in the range 10 µm to 100 µm.

10. A system according to claim 1, wherein the length of the piece of graded index multimode optical fiber is of the order of [¼+½n] times pitch with n =0, 1, 2, . . .

11. A system according to claim 1, wherein the piece of graded index multimode fiber is of a length less than [n+1] times pitch/2 with n =0, 1, 2, . . . , whereas the piece of step index multimode fiber is of a length that is less than pitch/4.

12. A method according to claim 5, wherein said piece of graded index multimode fiber is spliced to a cleaved end face of the monomode fiber and is designed to match an angular opening of a light beam to the mode specific to the monomode optical fiber and said piece of step index multimode fiber is spliced to a cleaved end face of the piece of graded index multimode fiber and is designed to match the diameter of the light beam to the working diameter of the piece of graded index multimode fiber.

13. A method according to claim 6, wherein said multiple lens has a radius of curvature that increases with increasing distance from the phototransducer.

14. A method according to claim 5, wherein said microlens has a radius which lies in the range 10 µm to 100 µm.

15. A method according to claim 5, wherein the length of the piece of graded index multimode optical fiber is of the order of (¼+½n) times pitch with n=0, 1, 2, . . .

16. A method according to claim 5, wherein the piece of graded index multimode fiber is of a length less than (n+1) times pitch/2 with n=0, 1, 2, . . . , whereas the piece of step index multimode fiber is of a length that is less than pitch/4.

17. An optical system comprising a monomode main optical fiber coupled to a phototransducer, by means of an assembly between the monomode optical fiber and the phototransducer, which assembly comprises, in succession: a piece of graded index multimode fiber spliced to a cleaved end face of the monomode fiber, said piece of graded index multimode fiber being designed to match an angular opening of a light beam to the mode specific to the monomode optical fiber, a piece of step index multimode fiber spliced to a cleaved end face of the piece of graded index multimode fiber, said piece of step index multimode fiber being designed to match the diameter of the light beam to the working diameter of the piece of graded index multimode fiber and a microlens fixed to a cleaved end face of said piece of step index multimode fiber, in regard of said phototransducer, said microlens being constituted by a multiple lens having a radius of curvature that increases with increasing distance from the phototransducer.

18. A system according to claim 17, wherein said microlens comprises at least two lens of different diameters.

19. A system according to claim 17, wherein said microlens comprises a number of lenses which is greater than two.

20. A system according to claim 17, wherein said microlens has a radius which lies in the range 10 µm to 100 µm.

21. A system according to claim 17, wherein the length of the piece of graded index multimode optical fiber is of the order of (¼+½n) times pitch with n=0, 1, 2, . . .

22. A system according to claim 17, wherein the piece of graded index multimode fiber is of a length less than (n+1) times pitch/2 with n=0, 1, 2, . . . , whereas the piece of step index multimode fiber is of a length that is less than pitch/4.

23. An optical system comprising a monomode main optical fiber coupled to a phototransducer, by means of an assembly between the monomode optical fiber and the phototransducer, which assembly comprises, in succession: a piece of graded index multimode fiber, a piece of step index multimode fiber, and a microlens and wherein the length of the piece of graded index multimode optical fiber is of the order of (¼+ ½n) times pitch with n=0, 1, 2, . . .

24. A system according to claim 23, wherein the microlens is constituted by a multiple lens having a radius of curvature that increases with increasing distance from the phototransducer.

25. A system according to claim 23, wherein said piece of graded index multimode fiber is spliced to a cleaved end face of the monomode fiber and is designed to match an angular opening of a light beam to the mode specific to the monomode optical fiber, said piece of step index multimode fiber is spliced to a cleaved end face of the piece of graded index multimode fiber and is designed to match the diameter of the light beam to the working diameter of the piece of graded index multimode fiber, and the microlens is fixed to a cleaved end face of the piece of step index multimode fiber.

26. A system according to claim 23, wherein said microlens comprises at least two lenses of different diameters.

27. A system according to claim 23, wherein said microlens comprises a number of lenses which is greater than two.

28. A system according to claim 23, wherein said microlens has a radius which lies in the range of 10 µm to 100 µm.

29. An optical system comprising a monomode main optical fiber coupled to a phototransducer, by means of an assembly between the monomode optical fiber and the phototransducer, which assembly comprises, in succession: a piece of graded index multimode fiber, a piece of step index multimode fiber, and a microlens and wherein the piece of graded index multimode fiber is of a length less than (n+1) times pitch/2 with n=0, 1, 2, . . . , whereas the piece of step index multimode fiber is of a length that is less than pitch/4.

30. A system according to claim 29, wherein the microlens is constituted by a multiple lens having a radius of curvature that increases with increasing distance from the phototransducer.

31. A system according to claim 29, wherein said piece of graded index multimode fiber is spliced to a cleaved end face of the monomode fiber and is designed to match an angular opening of a light beam to the mode specific to the monomode optical fiber, said piece of step index multimode fiber is spliced to a cleaved end face of the piece of graded index multimode fiber and, is designed to match the diameter of the light beam to the working diameter of the piece of graded index multimode fiber and the microlens is fixed to a cleaved end face of the piece of step index multimode fiber.

32. A system according to claim 29, wherein said microlens comprises at least two lenses of different diameters.

33. A system according to claim 29, wherein said microlens comprises a number of lenses which is greater than two.

34. A system according to claim 29, wherein said microlens has a radius which lies in the range 10 µm to 100 µm.

* * * * *